United States Patent [19]

McClelland et al.

[11] Patent Number: 4,933,426

[45] Date of Patent: Jun. 12, 1990

[54] CONDENSATION POLYMERS

[75] Inventors: Robert D. McClelland, Rochdale; Brian Parton, Bury, both of England

[73] Assignee: Imperial Chemical Industries PLC, London, England

[21] Appl. No.: 323,896

[22] Filed: Mar. 15, 1989

[30] Foreign Application Priority Data

Mar. 17, 1988 [GB] United Kingdom ............... 8806316

[51] Int. Cl.$^5$ .............................................. C08G 63/02
[52] U.S. Cl. ..................................... 528/272; 528/298; 528/301; 528/403; 428/195; 8/471; 8/647
[58] Field of Search ............... 528/272, 298, 301, 403; 428/195; 8/471, 647

[56] References Cited

FOREIGN PATENT DOCUMENTS 2069160 8/1981 United Kingdom .

OTHER PUBLICATIONS

CA76(26):160823t.
CA101(26):238240g.
CA106(4):25842w.
CA106(26):224579v.

Primary Examiner—John Kight, III
Assistant Examiner—Sam A. Acquah
Attorney, Agent, or Firm—Cushman, Darby and Cushman

[57] ABSTRACT

Colored condensation polymers useful as replacements for waxes in a thermal wax transfer process, said polymers being obtained by reacting a polymerizable lactone or a hydroxyalkanoic acid with a dye containing at least one active hydrogen atom.

5 Claims, No Drawings

CONDENSATION POLYMERS

This invention relates to condensation polymers and more particularly to coloured condensation polymers based on lactones or hydroxyalkanoic acids.

The polymerisation of lactones or hydroxyalkanoic acids in the presence of active hydrogen compounds to form polyesters is well known, the conditions for such polymerisation having been fully described in the prior art. For example, it is known to polymerise the lactone of 6-hydroxyhexanoic acid (caprolactone), to form useful polyester products.

The present invention provides coloured condensation polymers obtained by reacting a polymerisable lactone or a hydroxyalkanoic acid with a dye containing at least one active hydrogen atom.

Polymerisable lactones which may be used in preparing the coloured condensation polymers of the invention particularly include caprolactone. Suitable hydroxyalkanoic acids include omega-hydroxy-dodecanoic acid.

The dyes which may be used may be members of any of the known chemical classes or organic dyes, especially the azo (including monoazo and polyazo), anthraquinone, phthalocyanine and benzodifuranone series of dyes but also the nitro, diarylmethane, triarylmethane, xanthene, acridine, quinoline, methine, azine, oxazine, thiazine and indigoid series provided the dyes contain at least one active hydrogen atom per molecule. In the present context, active hydrogen atoms are defined as hydrogen atoms which are reactive as determined by the Zerewitinoff method, JACS (1927) 49, 3181. The active hydrogen atoms will typically be present in mercapto, carboxy and more especially hydroxy and primary or secondary amino groups present in the dyes. Such active hydrogen containing groups may be directly attached to aromatic or heterocyclic rings present in the dyes or they may be attached to aliphatic residues, for example alkyl groups, which are themselves directly or indirectly attached to the aromatic or heterocyclic rings. Preferred classes of dyes are those classified in the Colour Index as disperse and solvent dyes. Especially useful dyes contain one or more hydroxyalkyl, for example hydroxyethyl, groups.

The reaction between the lactone or hydroxyalkanoic acid and the dye may be performed using conditions already described for the polymerisation of lactones in the presence of active hydrogen compounds. Such conditions include the use of temperatures in the range 100° C. to 250° C. The ratio of dye to lactone or hydroxyalkanoic acid is selected so as to give the desired depth of colour in the product. If desired, one or more other active hydrogen containing material, such as a glycol, may be present during the polymerisation.

The coloured condensation polymers are useful as general purpose colouring matters for plastics, paints, textiles and the like but they are particularly useful for the production of thermal transfer material suitable for use in a thermal wax transfer or ink jet printing process.

In the thermal wax transfer process, a transfer sheet is used which comprises a film of paper or a plastics material coated on one side with a layer of a pigmented wax, for example carnauba wax, paraffin wax, montan wax or beeswax containing a dispersed pigment. When a thermal head, activated by input colour signals corresponding to the coloration of a coloured original, generates heat on the other side of the sheet or film, the wax coating is melted and transferred to an image-receiving material or copy sheet reproducing thereon an image of the coloured original. A process of this type is described in GB 2,069,160.

The coloured condensation polymers described herein may be used to replace the wax components of conventional coatings used on thermal wax transfer sheets.

Thus, in a further aspect of the invention, there is provided a thermal transfer sheet comprising a substrate having thereon a coating comprising a coloured condensation polymer obtained by reacting a polymerisable lactone or hydroxyalkanoic acid with a dye containing at least one active atom.

The substrate for the transfer sheets of the invention may be a plastics film or paper sheet having a thickness from $3\mu$ to $25\mu$. Specific examples of such substrates are polyethylene terephthalate, polyethylene and polystyrene films, glassine paper, synthetic paper and laminated paper.

The coating, which may also contain other conventional ingredients, usually has a thickness from $1\mu$ to $10\mu$. Such coatings are advantageous in that (i) the dye, being chemically bonded to the polymer, cannot crystallise therefrom and (ii) the coloured polymer is more transparent than conventional waxes such as carnauba wax. The present transfer sheets are especially suitable for the preparation of "overhead" transparency slides.

The invention is illustrated but not limited by the following Examples in which all parts and percentages are by weight.

EXAMPLE 1

1,4-Bis(2-hydroxyisobutylamino)anthraquinone (3.8 g) was stirred with caprolactone (75.6 g) and tetrabutyltitanate (2 drops). After stirring at 170° C. for six hours, the coloured condensation polymer was poured onto a Pyrex dish and allowing to crystallise. When applied to $6\mu$ polyester film from a tetrahydrofuran solution a clear blue film was obtained which is suitable for wax transfer printing.

EXAMPLE 2

The dyestuff formed by coupling diazotised 5-amino-4-cyano-3-methylisothiazole with bis(2-hydroxyethyl)-m-toluidine (7 g) was stirred with caprolactone (100 g) and tetrabutyltitanate (2 drops). After stirring at 170° C. for six hours, the coloured condensation polymer was poured onto a Pyrex dish and allowing to crystallise. When applied to $6\mu$ polyester film from a tetrahydrofuran solution a clear magenta film was obtained which is suitable for wax transfer printing.

EXAMPLE 3

The procedure of Example 1 was repeated except that the anthraquinone dye was replaced by the dyestuff formed by coupling diazotised 4-aminobenzenesulphonyl-N,N-bis(2-hydroxyethyl)amide with 1-N-ethyl-5-cyano-6-hydroxy-4-methylpyrid-2-one (4 g). When the coloured condensation polymer was applied to $6\mu$ polyester film from a tetrahydrofuran solution a clear magenta film was obtained which is suitable for wax transfer printing.

EXAMPLE 4

The procedure of Example 1 was repeated except for the inclusion of 10% of "Alloprene" (relative to the polymer) in the tetrahydrofuran solution. When the coloured condensation polymer was applied to 6μ polyester film from a tetrahydrofuran solution a clear blue film is obtained which is suitable for wax transfer printing. "Alloprene" is a chlorinated natural rubber available from ICI.

EXAMPLE 5

The procedure of Example 1 was repeated except for the inclusion of butylbenzylphthalate (relative to the polymer) in the tetrahydrofuran solution. When the coloured condensation polymer was applied to 6μ polyester film from a tetrahydrofuran solution a clear magenta film was obtained which is suitable for wax transfer printing.

EXAMPLES 6–16

The procedure described in Example 1 was repeated except that the anthraquinone dye described there was replaced in turn by the dyes identified in the following Table which also gives the colour of the polymeric product.

| Example | Dye | Colour |
| --- | --- | --- |
| 6 | Product of coupling diazotised 2-methoxy-5-nitroaniline with N,N-bis-2-hydroxyethyl-m-toluidine | Reddish-yellow |
| 7 | Product of coupling diazotised 3,4-dicyanoaniline with N,N-bis-2-hydroxyethyl-m-aminoacetanilide | Red |
| 8 | Product of coupling diazotised 3,4-dicyanoaniline with N-ethyl-N-hydroxyethyl-m-aminoacetanilide | Bluish-red |
| 9 | 3-phenyl-7-[4-(2-hydroxyethoxy)phenyl]-2,6-dioxo-2,6-dihydrobenzo[1:2-b, 4:5-b']difuran | Red |
| 10 | Product of coupling diazotised 2,4-dinitroaniline with N,N-bis-2-hydroxyethyl-m-aminoacetanilide | Bluish-red |
| 11 | 1-amino-4-hydroxy-2-[4-(2-hydroxyethoxy)-phenoxy]anthraquinone | Bluish-red |
| 12 | 1,4-diamino-N-(2-hydroxyethyl)-2,3-anthraquinone dicarboximide | Mid-blue |
| 13 | 1-(1-methyl-3-hydroxypropylamino)-4-amino-5-nitro-8-hydroxyanthraquinone | Turquoise |
| 14 | Product of coupling diazotised 2-amino-3,5-dinitrothiophene with N,N-bis-2-hydroxyethyl-m-aminoacetanilide | Greenish-blue |
| 15 | 1,5-bis-2-hydroxyethylaminoanthraquinone | Blue |
| 16 | Product of coupling diazotised N-(3-hydroxypropanoyl)-p-phenylenediamine with p-cresol | Greenish yellow |

We claim:
1. A coloured condensation polymer obtained by reacting a polymerisable lactone or a hydroxyalkanoic acid with a dye containing at least one active hydrogen atom.
2. A polymer according to claim 1 wherein the dye is selected from the group consisting of the azo, anthraquinone, phthalocyanine and benzodifuranone series.
3. A polymer according to claim 1 wherein the dye contains one or more hydroxyethyl groups.
4. A thermal transfer sheet comprising a substrate having thereon a coating comprising a coloured condensation polymer as claimed in claim 1.
5. A polymer according to claim 1 wherein the polymerisable lactone is caprolactone.

* * * * *